United States Patent
Su et al.

(10) Patent No.: US 10,407,544 B2
(45) Date of Patent: *Sep. 10, 2019

(54) TITANIUM DIOXIDE PIGMENT AND MANUFACTURING METHOD

(71) Applicant: Tronox LLC, Oklahoma City, OK (US)

(72) Inventors: Quan Su, Edmond, OK (US); Venkata Rama Rao Goparaju, Edmond, OK (US)

(73) Assignee: Tronox LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,818

(22) Filed: Sep. 13, 2018

(65) Prior Publication Data

US 2019/0010287 A1    Jan. 10, 2019

Related U.S. Application Data

(63) Continuation of application No. 14/528,910, filed on Oct. 30, 2014, now Pat. No. 10,125,219.

(51) Int. Cl.
| | |
|---|---|
| *C09C 1/36* | (2006.01) |
| *C08G 65/333* | (2006.01) |
| *C08G 65/32* | (2006.01) |
| *C08L 71/02* | (2006.01) |
| *C08K 3/22* | (2006.01) |

(52) U.S. Cl.
CPC ....... *C08G 65/33368* (2013.01); *C08G 65/32* (2013.01); *C08G 65/33355* (2013.01); *C08L 71/02* (2013.01); *C09C 1/3661* (2013.01); *C09C 1/3676* (2013.01); *C09C 1/3692* (2013.01); *C08K 2003/2241* (2013.01)

(58) Field of Classification Search
CPC .................................................. C09C 1/3676
See application file for complete search history.

(56) References Cited

U.S. PATENT DOCUMENTS

| | | | |
|---|---|---|---|
| 3,208,866 A | 9/1965 | Lewis | |
| 3,512,219 A | 5/1970 | Stern et al. | |
| 3,804,810 A | 4/1974 | Fryd | |
| 3,856,929 A | 12/1974 | Angerman et al. | |
| 3,884,871 A | 5/1975 | Herman et al. | |
| 3,923,968 A | 12/1975 | Basque et al. | |
| 4,075,031 A | 2/1978 | Allen | |
| 4,079,028 A | 3/1978 | Emmons et al. | |
| 4,235,985 A | 11/1980 | Tanaka et al. | |
| 4,777,224 A | 10/1988 | Gorzynski et al. | |
| 5,023,309 A | 6/1991 | Kruse et al. | |
| 5,201,949 A | 4/1993 | Allen et al. | |
| 5,203,916 A | 4/1993 | Green et al. | |
| 5,332,433 A | 7/1994 | Story et al. | |
| 5,412,019 A | 5/1995 | Roulstone et al. | |
| 5,700,318 A | 12/1997 | Brand et al. | |
| 5,840,112 A | 11/1998 | Morris et al. | |
| 5,922,120 A | 7/1999 | Subramanian et al. | |
| 5,976,237 A | 11/1999 | Halko et al. | |
| 6,080,802 A | 6/2000 | Emmons et al. | |
| 6,207,131 B1 | 3/2001 | Magyar et al. | |
| 6,262,152 B1 | 7/2001 | Fryd et al. | |
| 6,350,427 B1 | 2/2002 | Yuill et al. | |
| 6,562,314 B2 | 5/2003 | Akhtar et al. | |
| 7,179,531 B2 | 2/2007 | Brown et al. | |
| 7,264,672 B1 | 9/2007 | Trabzuni et al. | |
| 8,163,078 B2 | 4/2012 | Tarng et al. | |
| 9,315,615 B2 | 4/2016 | Goparaju et al. | |
| 10,125,219 B2 * | 11/2018 | Su | C08G 65/33368 |
| 2003/0017271 A1 | 1/2003 | Sikkar et al. | |
| 2003/0108667 A1 | 6/2003 | McIntyre et al. | |
| 2005/0228124 A1 | 10/2005 | Swarup et al. | |
| 2006/0000390 A1 | 1/2006 | Bolt et al. | |
| 2006/0188722 A1 | 8/2006 | White et al. | |
| 2009/0253853 A1 | 10/2009 | Lin et al. | |
| 2012/0058278 A1 | 3/2012 | Bohling et al. | |
| 2012/0316276 A1 | 12/2012 | Iwasa et al. | |
| 2013/0096250 A1 | 4/2013 | Bohling et al. | |

(Continued)

FOREIGN PATENT DOCUMENTS

| | | |
|---|---|---|
| EP | 2554609 A2 | 2/2013 |
| JP | 2007137965 A | 6/2007 |

(Continued)

OTHER PUBLICATIONS

Kostansek, Edward, Associative Polymer/Particle Dispersion Phase Diagrams III: Pigments, JCT Research vol. 3, No. 3, Jul. 2006, pp. 165-171.

Svanholm, T. et al., Adsorption studies of associative interactions between thickener and pigment particles, Progress in Organic Coatings 30 (1997), pp. 167-171.

Melville, I. et al., Pigment Thickener Interactions in Emulsion Paints, Polymers Paint Colour Journal, Mar. 18, 1997, vol. 177, No. 4187, pp. 174-184.

(Continued)

*Primary Examiner* — Vickey Nerangis
(74) *Attorney, Agent, or Firm* — McAfee & Taft

(57) ABSTRACT

A titanium dioxide pigment composition comprising a plurality of titanium dioxide particles and a polymer that is associated with the titanium dioxide particles and becomes associated with latex particles in an aqueous based coating formulation to inhibit agglomeration of the titanium dioxide particles while the coating formulation dries is provided. The polymer comprises a water soluble polymer backbone, at least one functional group that is attached to the polymer backbone and has an affinity for titanium dioxide, and at least one hydrophobic functional group that is attached to the polymer backbone and has an affinity for latex. Also provided is a method of manufacturing a titanium dioxide pigment composition.

32 Claims, 3 Drawing Sheets

(56) References Cited

U.S. PATENT DOCUMENTS

| | | | |
|---|---|---|---|
| 2014/0011943 A1 | 1/2014 | Bardman et al. | |
| 2014/0194566 A1 | 7/2014 | Auld et al. | |
| 2014/0275442 A1* | 9/2014 | Goparaju | C08G 18/83 525/440.01 |
| 2014/0329935 A1 | 11/2014 | Palmer, Jr. et al. | |
| 2015/0025172 A1 | 1/2015 | Bohling et al. | |
| 2016/0304668 A1 | 10/2016 | Su et al. | |

FOREIGN PATENT DOCUMENTS

| | | |
|---|---|---|
| SG | 183521 A1 | 10/2012 |
| WO | 2003004767 A1 | 1/2003 |
| WO | 2011112171 A1 | 9/2011 |
| WO | 2012008441 A1 | 1/2012 |
| WO | 2012058093 A1 | 5/2012 |
| WO | 2012116025 A1 | 8/2012 |
| WO | 2013002999 A1 | 1/2013 |
| WO | 2013004004 A1 | 1/2013 |
| WO | 2013032782 A1 | 7/2013 |
| WO | 2013169676 A1 | 11/2013 |
| WO | 2014150128 A1 | 9/2014 |
| WO | 2015010016 A1 | 1/2015 |

OTHER PUBLICATIONS

Tarng, Ming-Ren, Unifying Model for Associative Thickener Influences on Waterborne Coatings: II. Competitive Adsorption of Nonionic Surfactants and HEUR Thickeners on Titanium Dioxide Pretreated with Inorganic Stabilizers and Organic Oligomeric Dispersants, Journal of Coatings Technology, vol. 74, No. 935, Dec. 2002.
Glass, Edward J.., Adsorption of hydrophobically-modified, ethoxylated urethane thickeners on latex and titanium dioxide disperse phases, Advances in Colloid and Interface Science 79 (1999) 123-148.
European Search Report dated Mar. 22, 2016 in corresponding application No. 15192172.3, Tronox LLC.
Patent Examination Report dated May 27, 2016 in corresponding Australian application No. 2015243109, Tronox LLC.
Office Action dated Jul. 22, 2016 in Taiwan corresponding application No. 104131014, Tronox LLC.
Examination Report No. 2 dated Mar. 22, 2017 in corresponding Australian patent application No. 2015243109, Tronox LLC.
Office Action dated Apr. 24, 2017 in corresponding Canadian patent application 2,910,522, Tronox LLC.
First Office Action dated Nov. 3, 2017 in corresponding Chinese application No. 201510716287.2, Tronox LLC (English translation).
Notice of Reasons for Rejection dated Jun. 6, 2017 in corresponding Japanese application 2015-206102, Tronox LLC (English translation).
Substantive Examination Adverse Report issued in related Malaysian Application No. PI 2015702922 dated Nov. 30, 2018, Tronox LLC.
English translation of Second Office Action issued in related Chinese application No. 201510716287.2 dated Nov. 5, 2018, Tronox LLC.
Examination Report No. 2 issued in related Australian application No. 2015243109 dated Mar. 22, 2017, Tronox LLC.

* cited by examiner

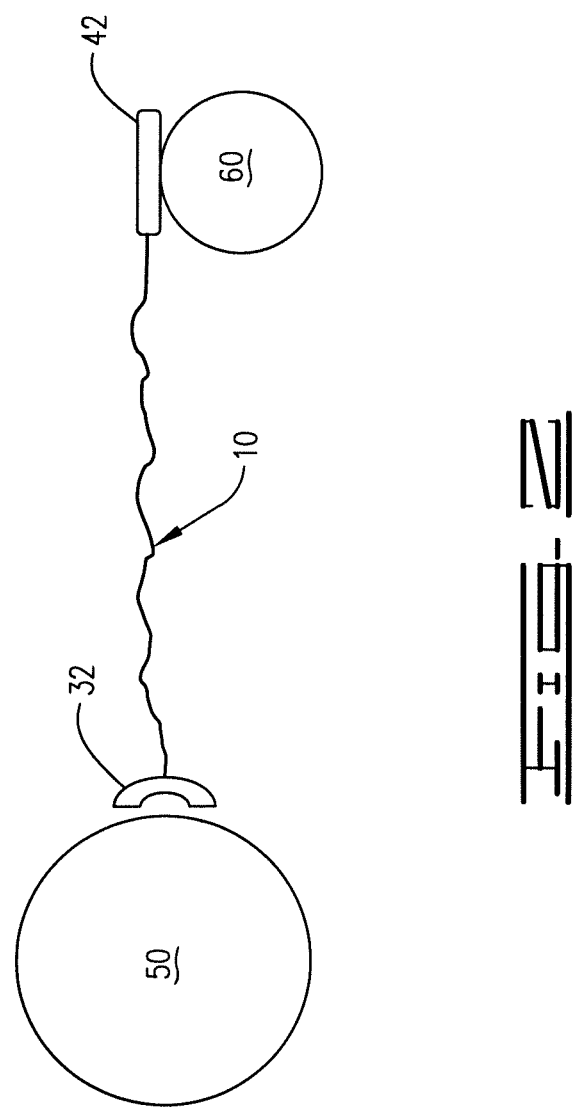

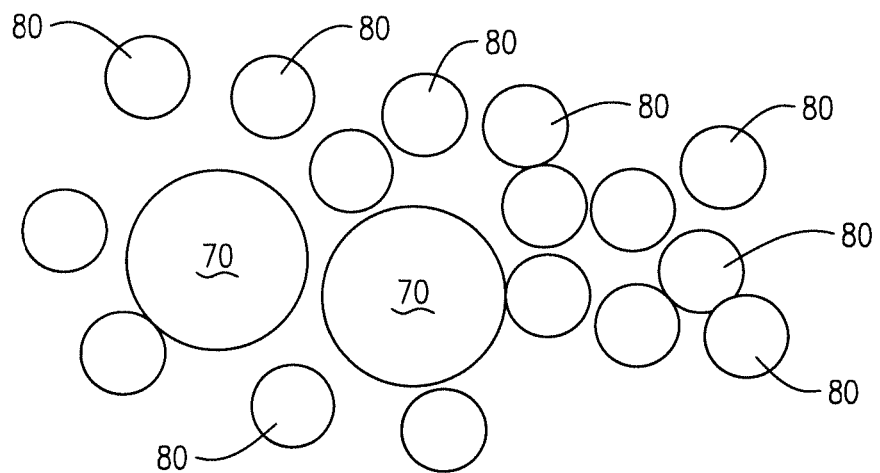
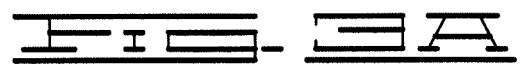
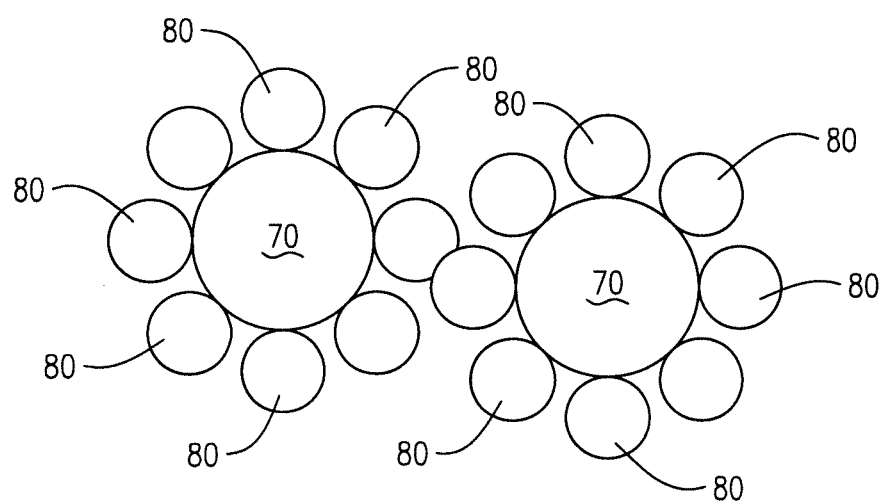
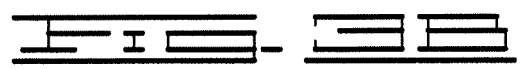

TITANIUM DIOXIDE PIGMENT AND MANUFACTURING METHOD

This application is a continuation of U.S. application Ser. No. 14/528,910, filed on Oct. 30, 2014, which is incorporated by reference.

BACKGROUND

Titanium dioxide is well known for use as a pigment and white opacifying agent. For example, titanium dioxide pigments are used in connection with coating formulations including paint and ink formulations, paper compositions, polymer compositions and other products. Titanium dioxide pigments are typically produced in powder form by either the sulfate process or the chloride process.

In the sulfate process for producing titanium dioxide, a titanium slag ore is dissolved in sulfuric acid to form titanyl sulfate. The titanyl sulfate is then hydrolyzed to form hydrous titanium dioxide. The hydrated titanium dioxide is heated in a calciner to grow titanium dioxide crystals to pigmentary dimensions.

In the chloride process for producing titanium dioxide, a dry titanium dioxide ore is fed into a chlorinator together with coke and chlorine to produce a gaseous titanium halide such as titanium tetrachloride. The produced titanium halide is purified and oxidized in a specially designed reactor at a high temperature to produce titanium dioxide particles having a desired particle size. Aluminum chloride is typically added to the titanium halide in the oxidation reactor to facilitate rutile formation and control particle size. The titanium dioxide and gaseous reaction products are then cooled and the titanium dioxide particles are recovered.

Whether produced by the sulfate process or the chloride process, the produced titanium dioxide particles are typically coated with one or more hydrous metal oxide inorganic materials to modify the properties and characteristics of the pigment for particular applications. For example, the pigment particles are often coated with compounds that improve the opacity, light stability and durability of the pigment. Examples of hydrous metal oxide inorganic materials used to coat titanium dioxide pigments are alumina and silica.

A primary property that a titanium dioxide pigment contributes to paint, paper, plastic and other products is hiding power. The hiding power of a titanium dioxide pigment is based on the ability of the pigment to scatter light in the base product (for example, a paint formulation) to which it is added. The ability of a titanium dioxide pigment to scatter light in the base product to which it is added (the "light scattering efficiency") depends on various factors, including the particle size of the pigment and the difference in refractive index of the pigment particles and their surroundings. A large difference in the refractive index of the pigment particles and the base product results in high scattering efficiency. The light scattering efficiency of the pigment further depends, for example, on the proximity of the pigment particles to one another. These factors have been addressed in various ways with varying degrees of success.

A problem associated with the use of titanium dioxide in aqueous based coating formulations such as paint and ink formulations is the tendency of the titanium dioxide particles to agglomerate in the coating formulations. Agglomeration of the titanium dioxide particles in an aqueous based coating formulation can adversely impact desirable properties of the pigment including the opacity, brightness, tint strength and other optical properties of the pigment.

For example, problematic pigment agglomeration in aqueous based coating formulations often occurs while the paint film dries after the paint film has been applied to a substrate (for example, a wall). Sometimes referred to as optical crowding, this phenomenon can decrease the light scattering efficiency of the pigment particles. Consequently, the tint strength of the pigment can be diminished.

Agglomeration of pigment particles in an aqueous media is increased when the pigment is utilized in a coating formulation at a relatively high pigment volume concentration. When the volume concentration of the pigment in the coating formulation increases to a certain level, the light scattering efficiency of the pigment can substantially decrease. At high volume concentrations, the pigment particles are closer to one another, resulting in an overlap of the respective light scattering cross-sections of the particles. As a result, the light scattering efficiency of the dispersed pigment is decreased. Additionally, the optical crowding effect can also decrease the light stability, brightness and opacity of the pigment.

Various techniques have been used to diminish optical crowding and address the other problems noted above. For example, fillers and extenders such as clay, calcium carbonate, alumina and silica have been added to aqueous based coating formulations to space adjacent pigment particles apart from one another. Hollow sphere, opaque polymers have been added to aqueous based coating formulations to create air voids in the formulations that function to space the pigment particles apart. Also, pigment particles have been coated with certain inorganic compounds that modify the surface properties of the particles to discourage the particles from agglomerating. Although such techniques have been utilized with varying degrees of success, room for improvement remains.

SUMMARY

In one aspect, a novel polymer is provided. The novel polymer (the "present polymer") comprises a water soluble polymer backbone, at least one functional group attached to the polymer backbone and having an affinity for titanium dioxide, and at least one hydrophobic functional group attached to the polymer backbone and having an affinity for latex.

In another aspect, a titanium dioxide pigment composition is provided. The titanium dioxide pigment composition (the "present titanium dioxide pigment composition") comprises a plurality of titanium dioxide particles and a polymer associated with the titanium dioxide particles. The polymer of the present titanium dioxide pigment composition is the present polymer.

In yet another aspect, a method of manufacturing a titanium dioxide pigment composition is provided. The method of manufacturing a titanium dioxide pigment composition (the "present method") comprises the steps of manufacturing titanium dioxide particles, and associating the present polymer with the titanium dioxide particles for inhibiting the agglomeration of the particles.

BRIEF DESCRIPTION OF THE DRAWINGS

FIG. 2 schematically illustrates how the polymer shown by FIG. 1 interacts with titanium dioxide particles and latex particles.

FIGS. 3A and 3B schematically illustrate how the present polymer prevents agglomeration of titanium dioxide particles in an aqueous coating formulation (for example, a paint formulation).

DETAILED DESCRIPTION

Figure 1:
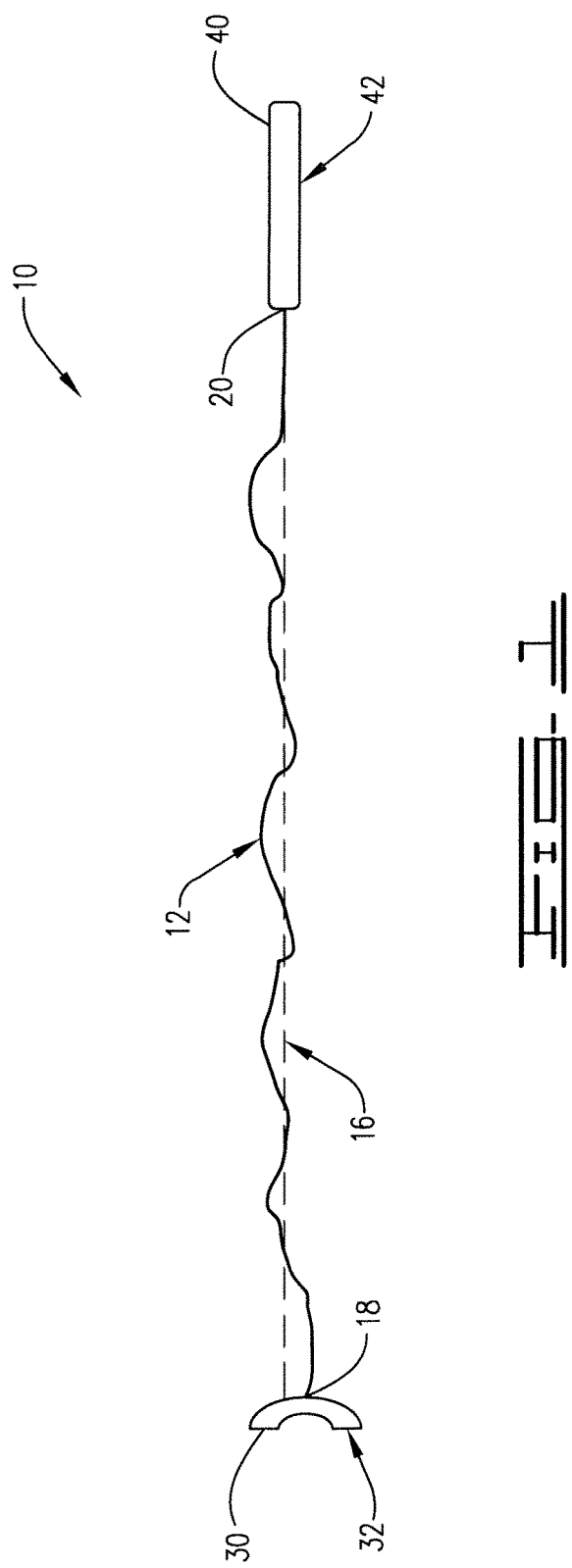
FIG. 1 schematically illustrates a particular embodiment of the present polymer wherein the polymer includes a linear polymer backbone that has a functional group having an affinity for titanium dioxide attached at one end thereby forming the head of the polymer and a functional group having an affinity for latex attached at the other end thereby forming the tail of the polymer.

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

The present polymer comprises a water soluble polymer backbone, at least one functional group attached to the polymer backbone and having an affinity for titanium dioxide (hereafter the "titanium dioxide functional group"), and at least one hydrophobic functional group attached to the polymer backbone and having an affinity for latex (hereafter the "latex functional group"). As used herein and in the appended claims, titanium dioxide and titanium dioxide pigment each mean a plurality of titanium dioxide particles. Latex means latex particles that are dispersed in an aqueous medium such as water to form an aqueous based, latex coating formulation such as a latex paint formulation. The latex can be synthetic or natural latex. For example, the latex can be an acrylic, a vinyl acrylic or a styrene acrylic latex resin.

The term "polymer" includes homopolymers and copolymers. A titanium dioxide functional group means a functional group having an affinity for titanium dioxide. A latex functional group means a hydrophobic functional group having an affinity for latex.

Also, as used herein and in the appended claims, the phrase "attached to the polymer backbone" means attached directly or indirectly to the polymer backbone. One component "having an affinity for" a second component means that the one component becomes associated with the second component when the two components are mixed together. One component being "associated with" another component means that the one component is attached to, bonded to or otherwise held in proximity to the second component due to van der Waals forces, covalent bonding, ionic interaction, acid-base interaction, hydrogen bonding, polar-polar attraction and/or other similar interactions. The type(s) of interactions may vary depending on the nature of the functional group.

In one embodiment, the titanium dioxide functional group attached to the polymer backbone is a nitrogen containing functional group. For example, the titanium dioxide functional group can be formed by the reaction of the polymer backbone with a compound selected from the group consisting of amines, amino acids, amides, ureas, urethane, ureido, biuret and imidazole. By way of further example, the titanium dioxide functional group can be formed by the reaction of the polymer backbone with a compound selected from the group consisting of amides, ureas, and imidazole. Examples of nitrogen containing functional groups suitable for use as a titanium dioxide functional group in association with the present polymer include 2-ethylhexyloxypropylamine (for example, Tomamine® PA-12EH sold by Air Products and Chemicals, Inc.), N-(2-hydroxyethyl)dodecanamide (for example, Mackamide™ LMA sold by Solvay), 1-(3-aminopropyl)imidazole, N-(2-hydroxyethyl)ethylene urea and L-leucine methyl ester hydrochloride.

In another embodiment, the titanium dioxide functional group is a nitrogen containing functional group that further comprises a hydroxyl group. Examples of such functional groups include amino alcohols such as 3-amino-1-propanol and 2-amino-2-methyl-1-propanol (for example, AMP™ Amino Alcohol from Angus® Chemical Company).

In another embodiment, the titanium dioxide functional group is formed by the reaction of the polymer backbone with a compound selected from the group consisting of polyols, polythiols, phosphoric acids, phosphonic acids, carboxylic acids, hydroxyl acids, and salts of hydroxyl acids. For example, the titanium dioxide functional group is formed by the reaction of the polymer backbone with a compound selected from the group consisting of polyols, phosphoric acids, phosphonic acids, carboxylic acids and hydroxyl acids. Examples include trimethylolpropane, di(trimethylolpropane), sugar polyols, polyphosphoric acid, citric acid, maleic acid, and 2-phosphonobutane-1,2,4-tricarboxylic acid.

In yet another embodiment, the titanium dioxide functional group is formed by the reaction of the polymer backbone with a compound selected from the group consisting of titanates capable of being covalently bonded to titanium dioxide, silanes capable of being covalently bonded to titanium dioxide, and borates capable of being covalently bonded to titanium dioxide. For example, the titanium dioxide functional group can be formed by the reaction of the polymer backbone with a silane capable of being covalently bonded to titanium dioxide. Examples of such compounds include hydroxyl silanes and amino silanes (for example (3-aminopropyl)triethoxysilane).

In another embodiment, the titanium dioxide functional group is formed by the reaction of the polymer backbone with a compound selected from the group consisting of silicone based compounds and fluorine based compounds. For example, the titanium dioxide functional group can be formed by the reaction of the polymer backbone with a compound selected from the group consisting of amine functionalized silicones, hydroxyl functionalized silicones, and carboxylic acid/anhydride functionalized silicones. An example of a suitable amine functionalized silicone is poly (dimethylsiloxane) bis(3-aminopropyl) terminated. An example of a suitable hydroxyl functionalized silicone is hydroxyl heptamethyltrisiloxane (for example, Silmer OH A0 sold by Siltech LLC). An example of a suitable fluorine based compound is 1H,1H,2H,2H-Perfluoro-1-octanol.

In one embodiment, the latex functional group attached to the polymer backbone is a super hydrophobic functional group. As used herein and in the appended claims, a hydrophobic functional group means a functional group that lacks an attraction to water or is repelled by water. A super hydrophobic functional group means that the contact angle of water on the functional group exceeds 150°.

In another embodiment, the latex functional group is formed by the reaction of the polymer backbone with a compound selected from the group of aliphatic compounds, aromatic compounds and aliphatic-aromatic compounds. By way of further example, the latex functional group is formed by the reaction of the polymer backbone with a compound selected from the group of alkyl/cycloalkyl/aryl/alkylaryl alcohols, alkyl/cycloalkyl/aryl/alkylaryl acids, and alkyl/cycloalkyl/aryl/alkylaryl amides. By way of further example, the latex functional group can be formed by the reaction of the polymer backbone with an ethoxylated alkyl/cycloalkyl/aryl/alkylaryl alcohol.

In another embodiment, the latex functional group is formed by the reaction of the polymer backbone with an alcohol. For example, the latex functional group can be formed by the reaction of the polymer backbone with a compound selected from the group consisting of fatty alcohols, saturated ethoxylated alcohols, alkyl phenols, aryl phenols, ethoxylated alkyl phenols and ethoxylated aryl phenols. For example, the latex functional group can be formed by the reaction of the polymer backbone with a compound selected from the group consisting of fatty alcohols, ethoxylated alcohols and phenols. Examples include C6 to C24 saturated alcohols such as cetyl alcohol and stearyl alcohol, C6 to C24 unsaturated alcohols such as erucyl alcohol, C6 to C24 saturated ethoxylated alcohols such as polyoxyethylene (10) stearyl ether (for example, sold as Brij™ S10 by Croda), and C6 to C24 unsaturated ethoxylated alcohols such as polyoxyethylene (20) oleyl ether (for example, Brij™ O20 sold by Croda), nonylphenol, and tristyrylphenol.

In another embodiment, the latex functional group is formed by the reaction of the polymer backbone with a compound selected from the group consisting of esters, thiols, acids, anhydrides and acyl halides. For example, the latex functional group can be formed by the reaction of the polymer backbone with a compound selected from the group consisting of fatty acid esters, fatty thiols, fatty acids and fatty acid anhydrides. Examples include methyl stearate, 1-dodecanethiol, palmitic acid and fatty acid chlorides.

In one embodiment, the water soluble polymer backbone comprises nitrogen. For example, the water soluble backbone can be selected from the group consisting of polyvinylpyrrolidone, polyethylenimine, polyoxazolines and polyamides.

In another embodiment, the water soluble polymer is selected from the group consisting of polyoxymethylene, polysaccharide, polyoxazoline, and polyvinyl ether.

In another embodiment, the water soluble polymer backbone is a polyoxyalkylene polymer or copolymer. For example, the water soluble polymer backbone can be polyethylene glycol. As another example, the water soluble polymer backbone can be polyethylene glycol-co-polypropylene glycol.

In another embodiment, the water soluble polymer backbone is polyacrylic acid.

The number of titanium dioxide functional groups and latex functional groups attached to the polymer backbone can vary. For example, in one embodiment, the polymer comprises a plurality of titanium dioxide functional groups attached to the polymer backbone, and a single latex functional group attached to the polymer backbone. In another embodiment, the polymer comprises a plurality of latex functional groups attached to the polymer backbone, and a single titanium dioxide functional group attached to the polymer backbone. In yet another embodiment, the polymer comprises a plurality of titanium dioxide functional groups attached to the polymer backbone and a plurality of latex functional groups attached to the polymer backbone.

The titanium dioxide function group(s) and latex functional group(s) can be attached at any point on the polymer backbone. For example, one or more titanium dioxide functional groups can be attached at one end of the polymer backbone, and one or more latex functional groups can be attached at the other end of the polymer backbone.

The water soluble polymer backbone can be linear, branched, or star shaped. For example, the water soluble polymer backbone can have a molecular weight in the range of 1,000 to 60,000. By way of further example, the water soluble polymer backbone can have a molecular weight in the range of 1,500 to 30,000. By way of further example, the water soluble polymer backbone can have a molecular weight in the range of 2,000 to 10,000. As used herein and in the appended claims, the "molecular weight" of the polymer backbone or other polymer means the number average molecular weight of the polymer backbone or other polymer.

In one embodiment, the water soluble polymer backbone is a linear polymer backbone having a longitudinal axis, and having a first end and a second end. For example, one or more titanium dioxide functional group can be attached to the first end of the polymer backbone, each thereby forming a head of the polymer, and one or more latex functional group can be attached to the second end of the polymer backbone, each thereby forming a tail of the polymer. In another embodiment, the polymer can comprise multiple backbones attached to one or more titanium dioxide functional groups and one or more latex functional groups.

In one embodiment, the titanium dioxide functional group attached to the polymer backbone is formed by the reaction of said polymer backbone with a compound selected from the group consisting of urethane, imidazole, fluoro alcohols, polythiols and silicone. In another embodiment, the titanium dioxide functional group is formed by the reaction of said polymer backbone with a compound selected from the group consisting of amides, urea, ureido, biuret, polyols, silane and titanates. In another embodiment, the titanium dioxide functional group is formed by the reaction of said polymer backbone with a compound selected from the group consisting of amines, amino alcohols, amino acids, carboxylic acids, hydroxyl acids, phosphoric acid and phosphonic acid.

In one embodiment, the latex functional group attached to the polymer backbone is formed by the reaction of said polymer backbone with a compound selected from the group consisting of fatty acids, fatty acid esters, fatty thiols, fatty acid anhydrides, alkyl acyl halides, and alkyl halides. In another embodiment, the latex functional group is formed by the reaction of said polymer backbone with a compound selected from the group consisting of ethoxylated fatty alcohols, ethoxylated cycloalkyl alcohols, ethoxylated alkyl phenols, and ethoxylated aryl phenols. In another embodiment, the latex functional group is formed by the reaction of said polymer backbone with a compound selected from the group consisting of fatty alcohols, aryl phenols, alkyl phenols, and cycloalkyl alcohols.

In one embodiment, the water soluble polymer backbone is selected from the group of polymers consisting of polyvinylpyrrolidone, polyethylenimine, and polyoxazolines. In another embodiment, the water soluble polymer backbone is selected from the group of polymers consisting of polyethylene glycol-co-polypropylene glycol, polyoxymethylene, and star-shaped and branched polyethylene glycol. In another embodiment, the water soluble polymer backbone is linear polyethylene glycol.

An example of a commercially available polymer that includes a suitable polymer backbone and latex functional group is polyoxyethylene stearyl ether, for example such a compound having the following Formula (1):

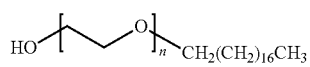
(1)

wherein n is 30 to 200.

The ethylene oxide repeating unit of the above compound functions as the polymer backbone of the present polymer. The linear carbon aliphatic tail of the above compound functions as the latex functional group of the present polymer. Thus, the polyoxyethylene stearyl ether has both a tail serving as a latex functional group and a suitable polymer backbone. For example, such a compound wherein "n" in the above formula is 100 is sold by Croda USA as polyoxyethylene (100) stearyl ether in association with the designation Brij™ S100.

The water solubility of the polymer backbone helps keep the present polymer from collapsing on the surface of the titanium dioxide media and helps assure that the polymer continues to function in an aqueous based coating formulation even as the coating formulation dries. Although the polymer backbone of the present polymer is water soluble in general, it can include some repeating units that are insoluble in an aqueous media. For example, in one embodiment, the polymer backbone is a copolymer having some insoluble repeating units.

Specific examples of the present polymer having different sized polymer backbones, different titanium dioxide functional groups and different latex functional groups are shown by Examples 1-22 below. Please note that these examples are not intended to represent a complete or even comprehensive list of specific polymers that can be the present polymer. Other examples of the present polymer can also be synthesized in view of the teachings herein and are intended to be encompassed by the claims of this application.

Referring now to the drawings, and in particular FIGS. 1 and 2, one particular embodiment of the present polymer is schematically illustrated and generally designated by the reference numeral 10. In this embodiment, the polymer 10 includes a linear polymer backbone 12 having a longitudinal axis 16. The polymer backbone 12 has a first end 18 and a second end 20. A titanium dioxide functional group 30 is attached to the first end 18 of the polymer backbone 12 and forms a head 32 of the polymer 10. A latex functional group 40 is attached to the second end 20 of the polymer backbone 12 and forms a tail 42 of the polymer 10.

FIG. 2 illustrates the interaction of the polymer 10 with a titanium dioxide particle 50 and a latex particle 60. As shown by FIG. 2, the head 32 of the polymer 10 is associated with and thereby associates the rest of the polymer with the titanium dioxide particle 50. The tail 42 of the polymer 10 is associated with and thereby associates the rest of the polymer with a latex particle 60.

FIGS. 3A and 3B illustrate how the polymer 10 prevents optical crowding of titanium dioxide particles 70 in an aqueous based, latex coating formulation comprising latex particles 80.

FIG. 3A depicts titanium dioxide particles 70 that are not associated with the present polymer as dispersed among latex particles 80 in an aqueous based, latex containing coating formulation. Due to optical crowding, the titanium dioxide particles 70 are crowded together and not evenly dispersed throughout the latex particles 80.

FIG. 3B depicts titanium dioxide particles 70 that are associated with the present polymer as dispersed among latex particles 80 in an aqueous based, latex containing coating formulation. In this case, the titanium dioxide particles 70 are not crowded together but rather are more evenly dispersed throughout the latex particles 80. Due to the attraction of the head 32 of the polymer 10 to the titanium dioxide 70 particles and the attraction of the tail 42 of the polymer to the latex particles 80, the present polymer causes the titanium dioxide particles to be surrounded by the latex particles. As a result, the titanium dioxide particles 70 are prevented from agglomerating in the coating formulation.

The present titanium dioxide pigment composition comprises a plurality of titanium dioxide particles and a polymer associated with the titanium dioxide particles. The polymer of the present titanium dioxide pigment composition is the present polymer as described herein (including all the forms and embodiments of the present polymer as described above and in the following examples and claims).

The titanium dioxide particles are manufactured by either the sulfate or the chloride process. For example, the titanium dioxide particles can be rutile titanium dioxide particles manufactured by the chloride process. For example, alumina can be incorporated into the lattice structure of the titanium dioxide particles to promote rutilization and control particle size. If the chloride process for manufacturing the titanium dioxide particles is used, alumina can be imparted to the lattice structure of the particles by adding aluminum chloride to the reactants during the vapor phase oxidation step of the process.

The titanium dioxide particles can be coated with one or more materials to modify the properties and characteristics of the pigment for particular applications. In one embodiment, the titanium dioxide particles are coated by a material selected from the group consisting of silica, alumina and mixtures thereof.

For example, the polymer can be present in the titanium dioxide pigment composition in an amount in the range of from 0.01 to 1% by weight, based on the total weight of the titanium dioxide pigment composition. By way of further example, the polymer can be present in the titanium dioxide pigment composition in an amount in the range of from 0.025 to 0.3% by weight, based on the total weight of the titanium dioxide pigment composition.

In one embodiment, the titanium dioxide pigment composition further comprises an aqueous media and is in the form of an aqueous slurry of the titanium dioxide particles and polymer. The titanium dioxide pigment composition can be formed and applied in both dry and slurry forms.

The present method comprises the steps of manufacturing titanium dioxide particles, and associating a polymer with the titanium dioxide particles for inhibiting the agglomeration of the particles. The polymer used in the present method is the present polymer as described herein (including all the forms and embodiments of the present polymer as described above and in the following examples and claims).

The titanium dioxide particles can be manufactured by either the sulfate or the chloride process in the manner described above in connection with the inventive titanium dioxide pigment composition. As in connection with the inventive titanium dioxide pigment composition, the titanium dioxide particles can be coated with one or more materials (such as silica, alumina and mixtures thereof) to modify the properties and characteristics of the pigment for particular applications.

In one embodiment, the present polymer is associated with the titanium dioxide particles by directly depositing a layer of the present polymer on the surface of the particles. In another embodiment, the present polymer is associated with the titanium dioxide particles by mixing the polymer with the particles in an aqueous medium such as water. When placed in a solution with titanium dioxide particles, the polymer orients itself such that the head having an affinity for titanium dioxide of the polymer interacts with the titanium dioxide particles. In one embodiment, the present polymer can be associated with the titanium dioxide particles during the pigment manufacturing process. The polymer modified titanium dioxide particles can then be added to an aqueous based, latex containing paint formulation.

Illustrative Examples

The present invention is illustrated more particularly by the following examples.

In the examples that follow, Brij™ S100 refers to polyoxyethylene (100) stearyl ether as sold by Croda USA. Tolonate™ HDB-LV refers to hexamethylene diisocyanate homopolymer as sold by Vencorex; IPDI refers to isophorone diisocyanate; DBTDL refers to dibutyltin dilaurate; Tomamine™ PA-12EH refers to 1-propanamine, 3-[(ethylhexyl)oxy] as sold by Air Products and Chemicals, Inc.; Mackamide® LMA refers to N-(2-hydroxyethyl)dodecanamide as sold by Solvay; AMP-95® refers to 2-amino-2-methyl-1-propanol as sold by Angus® Chemical Company; Agnique® 8105 refers to alkyl polyglycoside surfactant as sold by Cognis; Silmer™ OH A0 refers to monohydroxyl terminated silicone as sold by Siltech LLC; p-TsOH.H$_2$O refers to p-toluenesulfonic acid monohydrate; DMF refers to dimethylformamide; Igepal® CO-987 refers to nonylphenol ethoxylate having around 70 ethylene oxide units as sold by Rhodia; Igepal® DM-970 refers to dinonylphenol ethoxylate having around 150 ethylene oxide units as sold by Rhodia; Sapogenat® T 500 refers to tri-sec-butylphenol ethoxylate having around 50 ethylene oxide units as sold by Clariant. Emulsogen® TS540 refers to tristyrylphenol ethoxylate having around 54 ethylene oxide units as sold by Clariant. FTIR refers to Fourier Transform Infrared Spectroscopy.

Synthesis of the Present Polymer with Different Titanium Dioxide Functional Groups First, examples of the present polymer having the same polymer backbone and latex functional group, but various titanium dioxide functional groups, were synthesized. Specifically, Brij™ S100 was reacted with various compounds to impart various titanium dioxide functional groups thereto. Most of the synthesized polymers had a structure similar to the structure shown by FIG. 1.

Comparative Example 1

First, 10.0 grams of polyethylene glycol methyl ether, having a molecular weight of approximately 5000, and 100 milliliters of toluene were added to a three neck round-bottom flask. Any residual water was removed from the mixture using azeotropic distillation. The sample was cooled to approximately 70° C., after which 0.444 grams of isophorone diisocyanate in 5 milliliters of toluene were added. Next, 0.06 grams of DBTDL were added to the sample under agitation. The sample was further mixed for 3 hours at 90° C., after which the heat was removed and the sample was cooled to approximately 40° C. Next, 0.187 grams of AMP-95 in 5 milliliters of dried acetone were poured into the sample under good agitation. The sample was then further mixed to further the reaction. FTIR was used to monitor the isocyanate group peak until it disappeared. The solvent was removed using vacuum evaporation, and the sample was dried to constant weight.

Example 1—Amino Alcohol

First, 28.02 grams of Brij™ S100 and 150 milliliters of toluene were added together in a three neck round-bottom flask. Any residual water was removed using azeotropic distillation. The sample was then cooled to approximately 50° C., and 3.17 grams of Tolonate™ HDB-LV in 10 milliliters of toluene were then added to the sample. 0.20 grams of DBTDL were further added into the flask under agitation. The sample was mixed for 3 hours at 50° C., at which point the sample was cooled to 40° C. Next, 1.096 grams of AMP-95® in 5 milliliters of acetone were poured into the sample under good agitation, and the sample was mixed further to facilitate the reaction. FTIR was used to monitor the isocyanate group peak until it disappeared. The solvent was removed using vacuum evaporation, and the sample was dried to constant weight.

Example 2—Amino Alcohol

First, 28.02 grams of Brij™ S100 and 150 milliliters of toluene were added together in a three neck round-bottom flask. Any residual water was removed using azeotropic distillation. The sample was then cooled to 50° C., and 1.36 grams of IPDI in 10 milliliters of toluene were added to the sample. Next, 0.30 grams of DBTDL were added to the flask under agitation. The entire sample was then mixed for 3 hours at 90° C. and then cooled to 50° C. Next, 0.590 grams of AMP-95® in 5 milliliters of acetone were poured into the reaction under good agitation. The sample was then mixed to further the reaction. FTIR was used to monitor the isocyanate group peak until it disappeared. The solvent was removed using vacuum evaporation, and the sample was dried to constant weight.

Example 3—Amino Alcohol

First, 9.34 grams of Brij™ S100 and 100 milliliters of toluene were added together in a three neck round-bottom flask. Residual water was removed by azeotropic distillation. The sample was cooled to 50° C., and 0.444 grams of IPDI in 5 milliliters of toluene were added. Next, 0.08 grams of DBTDL were added to the flask under agitation. The sample was mixed for 3 hours at 90° C. and was then cooled down to 50° C. Thereafter, 0.165 grams of 3-amino-1-propanol in 5 milliliters of acetone were poured into the reaction under good agitation. The sample was then mixed to further the reaction. FTIR was used to monitor the isocyanate group peak until it disappeared. The solvent was removed using vacuum evaporation, and the sample was dried to constant weight.

Example 4—Amino Alcohol

First, 9.34 grams of Brij™ S100 and 100 milliliters of toluene were added together in a three neck round-bottom flask. Residual water was removed by azeotropic distillation. The sample was cooled down to 50° C. and 0.444 grams of IPDI in 5 milliliters of toluene was added. Next, 0.08 grams of DBTDL were added to the flask under agitation. The sample was mixed for 3 hours at 90° C. and subsequently cooled down to 50° C. Next, 0.21 grams of diethanolamine in 5 milliliters of acetone were poured into the reaction under good agitation. The sample was then mixed to further the reaction. FTIR was used to monitor the isocyanate group peak until it disappeared. The solvent was removed using vacuum evaporation and the sample was dried to constant weight.

Example 5—Amino Acid

First, 9.34 grams of Brij™ S100 and 100 milliliters of toluene were added together in a three neck round-bottom flask. Residual water was removed by azeotropic distillation. The sample was cooled down to 50° C., and 1.06 grams of Tolonate™ HDB-LV in 5 milliliters of toluene were added to the sample. Next, 0.06 grams of DBTDL were added to the sample under agitation. The sample was mixed for 3 hours at 50° C., at which point the heat supplied to the sample was turned off. Thereafter, 0.708 grams of L-leucine methyl ester hydrochloride were dissolved in 10 milliliters of DMF and then added into the sample. Next, 0.56 milliliters of triethylamine were added to the sample, and the sample was mixed for further reaction. FTIR was used to monitor the isocyanate group peak until it disappeared. The solvent was removed by vacuum evaporation. The residual was dissolved in 40 milliliters of water and 25 milliliters of propylene glycol, and 2.0 milliliters of 5N NaOH solution were added thereto. The sample was mixed for 3 hours at 80° C., and then cooled.

Example 6—Amine

First, 9.34 grams of Brij™ 5100 and 90 milliliters of toluene were added together in a three neck round-bottom flask. Residual water was removed by azeotropic distillation. The sample was cooled down to 50° C., and 1.06 grams of Tolonate™ HDB-LV in 5 milliliters of toluene were added thereto. Next, 0.06 grams of DBTDL were added to the sample under agitation. The sample was then mixed for 3 hours at 50° C., after which the heat was turned off. Next, 0.78 g of Tomamine™ PA-12EH in 5 milliliters of toluene were added to the sample, and the sample was mixed for further reaction. FTIR was used to monitor the isocyanate group peak until it disappeared. The solvent was removed using vacuum evaporation, and the sample was dried to constant weight.

Example 7—Amine

First, 9.34 grams of Brij™ 5100 and 100 milliliters of toluene were added together in a three neck round-bottom flask. Residual water was removed by azeotropic distillation, and the sample was cooled down to 50° C. Next, 1.04 grams of Tolonate™ HDB-LV in 5 milliliters of toluene were added to the sample. Next, 0.05 grams of DBTDL were added to the sample under agitation. The sample was mixed for 3 hours at 50° C., at which point the heat was turned off. Thereafter, 0.450 grams of 1-(3-aminopropyl)imidazole in 5 milliliters of toluene were added to the sample, and the sample was mixed for further reaction. FTIR was used to monitor the isocyanate group peak until it disappeared. The solvent was removed using vacuum evaporation, and the sample was dried to constant weight.

Example 8—Amide

First, 9.34 grams of Brij™ 5100, 0.972 grams of Mackamide® LMA and 100 milliliters of toluene were added together in a three neck round-bottom flask. Residual water was removed by azeotropic distillation, and the sample was cooled down to 50° C. Next, 1.07 grams of Tolonate™ HDB-LV in 10 milliliters of toluene were added to the sample. Next, 0.08 grams of DBTDL were added to the flask under agitation. The sample was then mixed at 50° C. for further reaction. FTIR was used to monitor the isocyanate group peak until it disappeared. The solvent was removed by vacuum evaporation and dried to constant weight.

Example 9—Amide

First, 9.34 grams of Brij™ 5100, 0.486 grams of Mackamide® LMA and 100 milliliters of toluene were added together in a three neck round-bottom flask. Residual water was removed by azeotropic distillation, and the sample was then cooled down to 60° C. Next, 0.444 grams of IPDI in 10 milliliters of toluene were added to the sample, and 0.08 grams of DBTDL were added to the flask under agitation. The sample was mixed at 80° C. for further reaction. FTIR was used to monitor the isocyanate group peak until it disappeared. The solvent was removed using vacuum evaporation, and the sample was dried to constant weight.

Example 10—Carboxylic acid/hydroxyl acid

First, 9.34 grams of Brij™ S100, 0.05 grams of p-TsOH.H$_2$O and 100 milliliters of toluene were added together in a three neck round-bottom flask. Residual water was removed from the sample by azeotropic distillation, and the sample was cooled down to 50° C. Next, 0.245 grams of maleic anhydride were added to the sample. The sample was then mixed for 6 hours at 115° C. The sample was then cooled down and any remaining solvent was removed using vacuum evaporation, and the sample was dried to constant weight.

Example 11—Polyol

First, 9.34 grams of Brij™ S100 and 80 milliliters of toluene were added together in a three neck round-bottom flask. Residual water was removed by azeotropic distillation. The sample was then cooled down to 50° C., and 0.444 grams of IPDI in 10 milliliters of toluene were added to the sample. Next, 0.08 grams of DBTDL were added to the flask under agitation. The sample was then mixed for 2 hours at 90° C., and then cooled down to 50° C. Next, 0.400 grams of di(trimethylolpropane) in 10 milliliters of DMF were added to the sample. The sample was then mixed at 80° C. for further reaction. FTIR was used to monitor the isocyanate group peak until it disappeared. The solvent was removed using vacuum evaporation, and the sample was dried to constant weight.

Example 12—Laurates—Polyol

First, 9.34 grams of Brij™ S100 and 80 milliliters of toluene were added together in a three neck round-bottom flask. Residual water was removed by azeotropic distillation. The sample was then cooled down to 60° C., and 0.467 grams of IPDI in 10 milliliters of toluene were added to the sample. Next, 0.08 grams of DBTDL were also added to the flask under agitation. The sample was then mixed for 4 hours at 90° C., and then cooled down to 60° C.

Next, in a second flask, 0.76 grams of a sorbitan monolaurate surfactant in 40 milliliters of toluene were azeotropically dried to remove residual water and then added into the first flask. The combined mixture was then stirred at 100° C. for further reaction. FTIR was used to monitor the isocyanate group peak until it disappeared. The solvent was removed using vacuum evaporation, and the sample was dried to constant weight.

Example 13—Glycosides—Polyol

First, 9.34 grams of Brij™ S100 and 80 milliliters of toluene were mixed together in a three neck round-bottom flask. Residual water was removed by azeotropic distillation. The sample was then cooled down to 60° C., after which 0.467 grams of IPDI in 5 milliliters of toluene were added to the sample. Next, 0.08 grams of DBTDL was also added into the flask under agitation. The sample was then mixed for 4 hours at 90° C., at which point it was cooled to 60° C.

Next, in a second flask, 1.97 grams of Agnique® 8105 in 50 milliliters of toluene and 10 milliliters of DMF were azeotropically distillated to remove water. The second flask was then cooled down to 60° C., and 10 milliliters of DMF were added to fully dissolve the polyglycoside-based polyol surfactant. The contents of the second flask were then added to the first flask. The combined mixture was raised to 105° C. to further the reaction. FTIR was used to monitor the isocyanate group peak until it disappeared. The solvent was removed by vacuum evaporation, and the sample was dried to constant weight.

Example 14—Hydroxyl Urea

First, 9.34 grams of Brij™ S100, 0.520 grams of N-(2-hydroxyethyl)ethylene urea and 80 milliliters of toluene were added together in a three neck round-bottom flask. Residual water was removed by azeotropic distillation. The sample was then cooled down to 50° C., at which point 1.07 grams of Tolonate™ HDB-LV in 10 milliliters of toluene were added. Next, 0.05 grams of DBTDL were added to the flask under agitation. The sample was further mixed at 50° C. for further reaction. FTIR was used to monitor the isocyanate group peak until it disappeared. The solvent was removed using vacuum evaporation, and the sample was dried to constant weight.

Example 15—Polyurea

In this example, multiple titanium dioxide functional groups were added to the polymer backbone.

First, 14.01 grams of Brij™ S100 and 120 milliliters of toluene were added together in a three neck round-bottom flask. Residual water was removed by azeotropic distillation. The sample was then cooled down to 50° C., at which point 0.67 grams of isophorone diisocyanate in 5 milliliters of toluene were added to the sample. Next, 0.10 grams of DBTDL were added to the flask under agitation. The sample was then mixed for 3 hours at 90° C., at which point the sample was cooled down to 40° C.

Next, 0.162 grams of ethylene diamine in 5 milliliters of toluene was poured into the flask under good agitation. The sample was then mixed for 20 minutes under room temperature conditions. Thereafter, 0.225 grams of 3-amino-1-propanol in 5 milliliters of acetone were added to the sample and mixed therewith for 5 minutes. Next, 0.67 grams of isophorone diisocyanate in 3 milliliters of toluene were added to the sample. The sample was then mixed for further reaction. FTIR was used to monitor the isocyanate group peak until it disappeared. The solvent was removed using vacuum evaporation, and the sample was dried to constant weight.

Example 16—Fluoro Alcohol

First, 9.34 grams of Brij™ S100 and 80 milliliters of toluene were added together in a three neck round-bottom flask. Residual water was removed by azeotropic distillation, and the sample was cooled down to 50° C. Next, 0.444 grams of IPDI in 10 milliliters of toluene were added to the flask. Thereafter, 0.08 grams of DBTDL were added to the flask under agitation. The sample was mixed for 2 hours at 90° C. and then cooled down to 50° C. Subsequently, 0.728 grams of 1H,1H,2H,2H-Perfluoro-1-octanol in 3 milliliters of 2-butanone were added to the sample. The sample was then mixed at 95° C. for further reaction. FTIR was used to monitor the isocyanate group peak until it disappeared. The solvent was removed using vacuum evaporation, and the sample was dried to constant weight.

Example 17—Silicone

First, 9.34 grams of Brij™ S100 and 80 milliliters of toluene were added together in a three neck round-bottom flask. Residual water was removed by azeotropic distillation. The sample was then cooled down to 50° C., at which point 0.467 grams of IPDI in 5 milliliters of toluene were added. Next, 0.08 grams of DBTDL were added to the flask under agitation. The sample was then mixed for 4 hours at 90° C., at which point the sample was cooled down to 60° C. Next, 0.616 grams of Silmer™ OH A0 in 5 milliliters of toluene were added. The temperature of the sample was then raised to 95° C. for further reaction. FTIR was used to monitor the isocyanate group peak until it disappeared. The solvent was then removed using vacuum evaporation and dried to constant weight.

For example, the reaction carried out in Example 1 is represented by Formula (2) below:

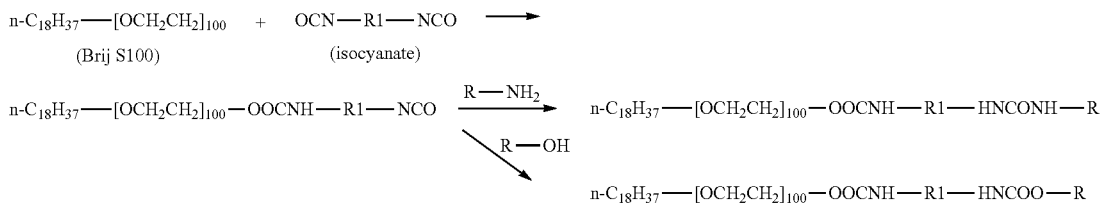

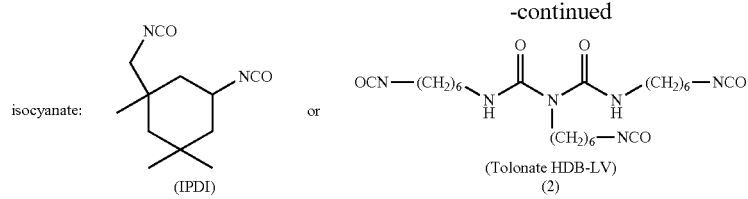

In addition to the functional groups described above, many other functional groups can be used to create titanium dioxide functional groups. For example, compounds containing N—H active hydrogen including amines, amino alcohols, amino acids, amides, urea, ureido, biuret, imidazole and other compounds may be used. Additionally, polyols and polythiols may be used. As another example, compounds containing acid functional groups and their salts such as phosphoric acid, phosphonic acid, carboxylic acid, sulfonic acid and sulfuric acid may be used. Additionally, hydroxyl acids and their salts may be used. In addition, hydroxyl amides, hydroxyl ureas, hydroxyl imidazoles and other similar compounds can be used. Further, compounds based on titanates, silanes, borates and other compounds that can covalently bond to the surface of titanium dioxide after hydrolysis or treatment with heat may be used. As another example, super-hydrophobic compounds such as fluoro and silicone based compounds may be used. Finally, other compounds that can form a strong bond with the surface of titanium dioxide can be used.

Synthesis of the Present Polymer with Different Latex Functional Groups

In order to vary the latex functional group, various polymers with different hydrophobic end groups were created. Generally, polymers similar to Brij™ S100, having a hydrophobic tail and a very long polyethylene glycol chain, were used. The surfactants used in this series of tests included Igepal® CO-987; Igepal® DM-970; Sapogenat® T 500; and Emulsogen® TS540.

Like Brij™ S100, the above surfactants can be used to synthesize a polymer having a structure similar to the structure shown in FIG. 1. Latex functional groups can also be attached to the polymer backbone through the reaction of fatty acids, alcohols, amides and polyethylene glycols with or without connectors. Examples are provided below.

Example 18 (Based on Igepal® CO-987)

First, 9.43 grams of Igepal® CO-987 and 120 milliliters of toluene were added together in a three neck round-bottom flask. Water was removed by azeotropic distillation, and the sample was then cooled down to 50° C. Next, 1.04 grams of Tolonate™ HDB-LV in 5 milliliters of toluene were also added to the sample. Thereafter, 0.06 grams of DBTDL were added to the flask under agitation. The sample was then mixed for 3 hours at 50° C. The sample was then cooled down to 40° C. Thereafter, 0.356 grams of AMP-95® in 5 milliliters of acetone were poured into the flask under good agitation. The sample was then mixed for further reaction. FTIR was used to monitor the isocyanate group peak until it disappeared. The solvent was removed using vacuum evaporation, and the sample was dried to constant weight.

Example 19 (Based on Igepal® DM-970)

First, 8.34 grams of Igepal® DM-970 and 100 milliliters of toluene were added together in a three neck round-bottom flask. Residual water was removed by azeotropic distillation. The sample was then cooled down to 50° C., at which point 0.86 grams of Tolonate™ HDB-LV in 5 milliliters of toluene were added. Next, 0.06 grams of DBTDL were added to the flask under agitation. The sample was then mixed for 3 hours at 50° C. and then cooled down to 40° C. Thereafter, 0.337 grams of AMP-95® in 5 milliliters of acetone were poured into the reaction flask under good agitation. The sample was then mixed for further reaction. FTIR was used to monitor the isocyanate group peak until it disappeared. The solvent was removed using vacuum evaporation, and the sample was dried to constant weight.

Example 20 (Based on Sapogenat® T 500)

4.924 grams of Sapogenat® T 500 and 100 milliliters of toluene were added together in a three neck round-bottom flask. Residual water was removed by azeotropic distillation and then the sample was cooled down to 50° C. Thereafter, 1.04 grams of Tolonate™ HDB-LV in 5 milliliters of toluene were added to the flask. Subsequently, 0.06 grams of DBTDL were added to the flask under agitation. The sample was then mixed for 3 hours at 50° C., at which point it was cooled down to 40° C. Next, 0.356 grams of AMP-95® in 5 milliliters of acetone were poured into the reaction under good agitation and then the sample was mixed for further reaction. FTIR was used to monitor the isocyanate group peak until it disappeared. The solvent was removed using vacuum evaporation, and the sample was dried to constant weight.

Example 21 (based on Emulsogen® 540)

First, 5.56 grams of Emulsogen® 540 and 100 milliliters of toluene were added together in a three neck round-bottom flask. Residual water was removed by azeotropic distillation, and the sample was then cooled down to 50° C. Thereafter, 1.04 grams of Tolonate™ HDB-LV in 5 milliliters of toluene were added to the sample. Next, 0.06 grams of DBTDL were added to the flask under agitation. The sample was mixed for 3 hours at 50° C. and then cooled down to 40° C. Next, 0.356 grams of AMP-95® in 5 milliliters of acetone were poured into the reaction flask under good agitation. The sample was then mixed for further reaction. FTIR was used to monitor the isocyanate group peak until it disappeared. The solvent was removed using vacuum evaporation, and the sample was dried to constant weight.

Example 22—Ester

In this example, polyethylene glycol was modified to include a 15 carbon carboxylic acid chain and an ester latex functional group. First, 12.0 grams of poly(ethylene glycol) having a molecular weight of about 6000, 0.512 grams of palmitic acid, 0.05 grams of pTsOH.H2O and 100 milliliters of toluene were added together in a three neck round-bottom flask. With a Dean-stark trap installed, the temperature of the sample was raised to reflux. Water was removed by azeotropic distillation. The sample was kept at reflux for 22 hours for further reaction at which point the sample was cooled down to 50° C. Subsequently, 1.04 grams of Tolonate™ HDB-LV in 5 milliliters of toluene were added to the flask.

Next, 0.08 grams of DBTDL were added to the flask under agitation. The combined sample was then mixed for 3 hours at 50° C. and then cooled down to 40° C. Next, 0.365 grams of AMP-95® in 5 milliliters of acetone were poured into the reaction under good agitation. The sample was then mixed for further reaction. FTIR was used to monitor the isocyanate group peak until it disappeared. The solvent was removed using vacuum evaporation, and the sample was dried to constant weight.

Suitable groups having an affinity for latex are not limited to the groups discussed above. For example, aliphatic, aromatic or aliphatic-aromatic alcohols may be used. In addition, ethoxylated aliphatic, ethoxylated aromatic and ethoxylated aliphatic-aromatic alcohols may be used. By way of further example, aliphatic, aromatic or aliphatic-aromatic anhydrides can be used. Additionally, aliphatic, aromatic or aliphatic-aromatic amides and acyl halides may be used. In addition, halogenated aliphatic, halogenated aromatic and halogenated aliphatic-aromatic compounds can be used. Also, aliphatic, aromatic and aliphatic-aromatic isocyanates and thioisocyanates can be used. Finally, aliphatic, aromatic and aliphatic-aromatic amines can be used.

Testing of the Present Titanium Dioxide Pigment Composition

Example 23

The polymers synthesized above were mixed with propylene glycol and water and added to a slurry of titanium dioxide particles. The titanium dioxide was CR-826, a universal pigment manufactured by Tronox LLC. The titanium dioxide slurries were formed with a hydrophilic acrylic acid copolymer based dispersant. The synthesized polymers were added to the slurries in amounts of 0.2%, 0.1% and 0.05% by weight, based on the weight of the titanium dioxide particles. The polymer modified pigment slurries were then evaluated for tint strength.

The polymer modified pigment slurries were tested in the model latex paint formulation shown in TABLE 1. In each test, the paint was directly tinted with 1.6 g of ColorTrend 808-9907 universal carbon black colorant. The color acceptance was tested by the color rub-up method. The tint strength was measured using an UltraScan XE and based on the assumption that the tinting strength of the control was 100%.

In each test, a sample (with the polymer modified pigment) and a standard (without the polymer modified pigment) were prepared in identical formulations. Both the sample and standard formulations were then drawn down side by side on a Leneta card. The CIE L* and b* values of the dried paint were measured using an integrating sphere spectrophotometer and these values were used to calculate the tint strength and tint tone of the obtained pigment.

Tint strength was calculated using the Kubelka Munk Equation where:

$$\text{Tint Strength} = \left( \frac{\left(\frac{K}{S}\right)_{Standard}}{\left(\frac{K}{S}\right)_{Sample}} \right) (\text{Assigned Value})$$

where:
K=Absorbance of carbon black pigment
S=Scatter of titanium dioxide pigment
Tint Tone was calculated as follows:

$$\text{Tint Tone} = b^*_{sample} - b^*_{standard} + \text{Assigned Value}$$

The results are listed in TABLE 2.

TABLE 1

24% PVC Semi-gloss Paint Formulation
(with 2.5 lbs/gal Titanium Dioxide)

| Material | Description | Supplier | Weight (g) |
|---|---|---|---|
| Rhoplex ™ VSR-2015 | Latex resin | Dow | 114 |
| TiO₂ Pigment slurry* | | Tronox | 78 |
| BYK-24 | Defoamer | BYK Chemie | 0.6 |
| Dextrol ™ OC-50 | Surfactant | Ashland | 0.3 |
| Proxel ™ GXL | Biocide | Arch | 0.1 |
| 2.5% Natrosol ™ 250MR solution** | Thickener | Ashland | 32 |
| AMP-95 ® | Neutralizing agent | Angus | 0.2 |
| Water* | | | 11.2 |
| ColorTrend 808-9907 lamp black | Colorant | Evonik | 1.6 |
| Total Paint Weight | | | 238 |

*a slurry containing 75.5% solids was formed
**the dry Natrosol 250MR powder is from Ashland

TABLE 2

Performance of Titanium Dioxide Pigment Composition in Aqueous Paint Formulation

| Polymeric surfactant # | Polymer loading on dry TiO₂ (%) | Color acceptance | Tint strength (%) |
|---|---|---|---|
| Control | 0 | Pass | 100 |
| Poly(ethylene glycol) MW 4600* | 0.10 | Pass | 100 |
| Brij ™ S100** | 0.10 | Pass | 100 |
| Comparative Example 1*** | 0.05 | Pass | 99 |
| Comparative Example 1*** | 0.10 | Pass | 100 |
| Example 1 | 0.05 | Pass | 104 |
| Example 2 | 0.06 | Pass | 107 |
| Example 3 | 0.10 | Pass | 105 |
| Example 4 | 0.10 | Pass | 105 |
| Example 5 | 0.10 | Pass | 105 |
| Example 6 | 0.10 | Pass | 104 |
| Example 7 | 0.05 | Pass | 105 |
| Example 8 | 0.10 | Pass | 107 |
| Example 9 | 0.10 | Pass | 106 |
| Example 10 | 0.05 | Pass | 103 |
| Example 11 | 0.05 | Pass | 106 |
| Example 12 | 0.04 | Pass | 105 |
| Example 13 | 0.05 | Pass | 103 |
| Example 14 | 0.10 | Pass | 104 |
| Example 15 | 0.10 | Pass | 106 |
| Example 16 | 0.05 | Pass | 104 |
| Example 17 | 0.05 | Pass | 107 |
| Example 18 | 0.10 | Pass | 107 |
| Example 19 | 0.05 | Pass | 106 |
| Example 20 | 0.05 | Pass | 106 |
| Example 21 | 0.20 | Pass | 105 |
| Example 22 | 0.10 | Pass | 107 |

*polymer backbone without a titanium functional group or a latex functional group
**polymer backbone with a latex functional group but without a titanium functional group
***polymer backbone with a titanium functional group but without a latex functional group TABLE 2 illustrates that the present titanium dioxide pigment composition exhibits a substantial increase in tint strength compared to the same pigment without a polymer as described in the present application.

Example 24

The polymer synthesized in Examples 4 above was dissolved in propylene glycol and water and added to slurries of titanium dioxide particles. In these tests, the titanium dioxide pigment was CR-813, a flat grade pigment manufactured by Tronox LLC. The titanium dioxide slurries were formed with a carboxylic acid based surfactant. The synthesized polymer was added to the slurries in an amount of 0.1% by weight, based on the weight of the titanium dioxide particles.

The polymer modified pigment slurries were tested in the model latex paint formulation shown in TABLE 3 below. In each test, 146.0 grams of the flat paint were directly tinted with 1.15 grams of ColorTrend 888 universal carbon black colorant. The color acceptance was tested by the color rub-up method. The tint strength was measured as described above in Example 23. The results are listed in TABLE 4.

TABLE 3

60% PVC Flat Latex Paint Formulation
(with 1.5 lbs/gal Titanium Dioxide)

| Material | Weight (g) |
| --- | --- |
| Water | 100.0 |
| Thickener solution | 100.0 |
| Fluidizing agent | 1.5 |
| Dispersant | 7.0 |
| Wetting agent | 2.0 |
| Solvent | 23.0 |
| Defoamer | 1.0 |
| Biocide | 1.5 |
| Titanium Dioxide | 150.0 |
| China Clay | 75.0 |
| Kaolin Clay | 75.0 |
| Cal-White | 150.0 |
| Coalescent | 6.0 |
| Water | 100.0 |
| Thickener solution | 133.0 |
| Defoamer | 1.0 |
| Vinyl acrylic latex | 226.0 |
| Total | 1152.0 |

TABLE 4

Polymeric surfactant application in flat grade TiO$_2$ CR-813.

| Polymeric surfactant # | Polymer loading on dry TiO$_2$ (%) | Tinting strength (%) |
| --- | --- | --- |
| Control | 0 | 100 |
| Example 4 | 0.10 | 107 |

Thus, the present polymer can be used to successfully treat both universal grade pigment (for example, CR-826 from Tronox, LLC) and flat-grade pigment (for example, CR-813 from Tronox, LLC) and corresponding semi-gloss paint formulations (for example, as shown by TABLE 2) and flat-grade paint formulations (for example, as shown by TABLE 4).

While the technology has been particularly shown and described with reference to specific embodiments, it should be understood by those skilled in the art that various changes in form and detail may be made without departing from the spirit and scope of the technology as defined by the appended claims.

What is claimed is:

1. A titanium dioxide pigment composition, comprising:
a plurality of titanium dioxide particles;
a polymer that is associated with said titanium dioxide particles and becomes associated with latex particles in an aqueous based coating formulation to inhibit agglomeration of said titanium dioxide particles while the coating formulation dries, said polymer including:
a water soluble polymer backbone having a longitudinal axis, a first point and a second point, wherein said water soluble polymer backbone is a polyoxyalkylene polymer or copolymer;
at least one functional group that is attached to said first point of said polymer backbone, has an affinity for titanium dioxide, and is formed by the reaction of said polymer backbone with a compound having an amino group, a carboxylic acid group, or a hydroxyl group, said compound having an amino group, a carboxylic acid group, or a hydroxyl group being selected from the group of a urea, imidazole, an amide, an amino alcohol, an amino acid, an amine, a carboxylic acid, a hydroxyl acid, a polyol, a silane capable of being covalently bonded to titanium dioxide, and a borate capable of being covalently bonded to titanium dioxide; and
at least one hydrophobic functional group that is attached to said second point of said polymer backbone, has an affinity for latex, and is selected from the group of a super hydrophobic functional group and a functional group formed by the reaction of said polymer backbone with a compound including an aliphatic, aromatic, or aliphatic-aromatic group.

2. The titanium dioxide pigment composition of claim 1, wherein said polymer backbone is a linear polymer backbone, said first point of said polymer backbone is a first end of said polymer backbone, and said second point of said polymer backbone is a second end of said polymer backbone, wherein said functional group having an affinity for titanium dioxide is attached to said first end of said polymer backbone thereby forming a head of said polymer, and said functional group having an affinity for latex is attached to said second end of said polymer backbone thereby forming a tail of said polymer.

3. The titanium dioxide pigment composition of claim 1, wherein said functional group that is attached to said first point of said polymer backbone and has an affinity for titanium dioxide is formed by the reaction of said polymer backbone with a compound having an amino group and being selected from the group of a urea, imidazole, an amide, an amino alcohol, an amino acid, an amine, a silane capable of being covalently bonded to titanium dioxide, and a borate capable of being covalently bonded to titanium dioxide.

4. The titanium dioxide pigment composition of claim 1, wherein said functional group that is attached to said first point of said polymer backbone and has an affinity for titanium dioxide is formed by the reaction of said polymer backbone with a compound having a hydroxyl group and being selected from the group of a urea, imidazole, an amide, an amino alcohol, an amino acid, a hydroxyl acid, a polyol, a silane capable of being covalently bonded to titanium dioxide, and a borate capable of being covalently bonded to titanium dioxide.

5. The titanium dioxide pigment composition of claim 1, wherein said functional group that is attached to said first point of said polymer backbone and has an affinity for titanium dioxide is formed by the reaction of said polymer backbone with a compound having a carboxylic acid group and being selected from the group of a urea, an amide, an amino acid, an amine, a carboxylic acid, a hydroxyl acid, a silane capable of being covalently bonded to titanium dioxide, and a borate capable of being covalently bonded to titanium dioxide.

6. The titanium dioxide pigment composition of claim 1, wherein said functional group that is attached to said first point of said polymer backbone and has an affinity for titanium dioxide is formed by the reaction of said polymer backbone with a compound selected from the group of a urea, an amide, an amino alcohol, an amino acid, an amine, a carboxylic acid, a hydroxyl acid, a polyol, and a silane capable of being covalently bonded to titanium dioxide.

7. The titanium dioxide pigment composition of claim 1, wherein said functional group that is attached to said first point of said polymer backbone and has an affinity for titanium dioxide is formed by the reaction of said polymer backbone with a compound selected from the group of a urea, an amide, an amino alcohol, an amino acid, a hydroxyl acid, and a polyol.

8. The titanium dioxide pigment composition of claim 1, wherein said functional group that is attached to said first point of said polymer backbone and has an affinity for titanium dioxide is formed by the reaction of said polymer backbone with an amino alcohol.

9. The titanium dioxide pigment composition of claim 1, wherein said functional group attached to said polymer backbone and having an affinity for latex is a super hydrophobic functional group.

10. The titanium dioxide pigment composition of claim 1, wherein said hydrophobic functional group attached to said polymer backbone and having an affinity for latex is formed by the reaction of said polymer backbone with a compound including an aliphatic, aromatic or aliphatic-aromatic group.

11. The titanium dioxide pigment composition of claim 1, wherein said hydrophobic functional group attached to said polymer backbone and having an affinity for latex is formed by the reaction of said polymer backbone with an alcohol.

12. The titanium dioxide pigment composition of claim 1, wherein said hydrophobic functional group attached to said polymer backbone and having an affinity for latex is formed by the reaction of said polymer backbone with a compound selected from the group of an ester, a thiol, an acid, an anhydride and an acyl halide.

13. The titanium dioxide pigment composition of claim 1, wherein said the water soluble polymer backbone is polyethylene glycol or polyethylene glycol-co-polypropylene glycol.

14. The titanium dioxide pigment composition of claim 1, wherein said titanium dioxide particles are rutile titanium dioxide particles manufactured by the chloride process.

15. The titanium dioxide pigment composition of claim 1, wherein said polymer is present in said titanium dioxide pigment composition in an amount in the range of from 0.01 to 1% by weight, based on the total weight of said titanium dioxide pigment composition.

16. The titanium dioxide pigment of claim 1, further comprising an aqueous media.

17. A method of manufacturing a titanium dioxide pigment composition, comprising:
manufacturing titanium dioxide particles; and
associating a polymer with said titanium dioxide particles that also becomes associated with latex particles in an aqueous based coating formulation to inhibit agglomeration of said titanium dioxide particles while the coating formulation dries, said polymer including:
a water soluble polymer backbone having a longitudinal axis, a first point and a second point, wherein said water soluble polymer backbone is a polyoxyalkylene polymer or copolymer;
at least one functional group that is attached to said first point of said polymer backbone, has an affinity for titanium dioxide, and is formed by the reaction of said polymer backbone with a compound having an amino group, a carboxylic acid group, or a hydroxyl group, said compound having an amino group, a carboxylic acid group, or a hydroxyl group being selected from the group of a urea, imidazole, an amide, an amino alcohol, an amino acid, an amine, a carboxylic acid, a hydroxyl acid, a polyol, a silane capable of being covalently bonded to titanium dioxide, and a borate capable of being covalently bonded to titanium dioxide; and
at least one hydrophobic functional group that is attached to said second point of said polymer backbone, has an affinity for latex, and is selected from the group of a super hydrophobic functional group and a functional group formed by the reaction of said polymer backbone with a compound including an aliphatic, aromatic, or aliphatic-aromatic group.

18. The method of claim 17, wherein said polymer backbone is a linear polymer backbone, said first point of said polymer backbone is a first end of said polymer backbone, and said second point of said polymer backbone is a second end of said polymer backbone, wherein said functional group having an affinity for titanium dioxide is attached to said first end of said polymer backbone thereby forming a head of said polymer, and said functional group having an affinity for latex is attached to said second end of said polymer backbone thereby forming a tail of said polymer.

19. The method of claim 17, wherein said functional group that is attached to said first point of said polymer backbone and has an affinity for titanium dioxide is formed by the reaction of said polymer backbone with a compound having an amino group and being selected from the group of a urea, imidazole, an amide, an amino alcohol, an amino acid, an amine, a silane capable of being covalently bonded to titanium dioxide, and a borate capable of being covalently bonded to titanium dioxide.

20. The method of claim 17, wherein said functional group that is attached to said first point of said polymer backbone and has an affinity for titanium dioxide is formed by the reaction of said polymer backbone with a compound having a hydroxyl group and being selected from the group of a urea, imidazole, an amide, an amino alcohol, an amino acid, a hydroxyl acid, a polyol, a silane capable of being covalently bonded to titanium dioxide, and a borate capable of being covalently bonded to titanium dioxide.

21. The method of claim 17, wherein said functional group that is attached to said first point of said polymer backbone and has an affinity for titanium dioxide is formed by the reaction of said polymer backbone with a compound having a carboxylic acid group and being selected from the group of a urea, an amide, an amino acid, an amine, a carboxylic acid, a hydroxyl acid, a silane capable of being covalently bonded to titanium dioxide, and a borate capable of being covalently bonded to titanium dioxide.

22. The method of claim 17, wherein said functional group that is attached to said first point of said polymer backbone and has an affinity for titanium dioxide is formed by the reaction of said polymer backbone with a compound selected from the group of a urea, an amide, an amino alcohol, an amino acid, an amine, a carboxylic acid, a hydroxyl acid, a polyol, and a silane capable of being covalently bonded to titanium dioxide.

23. The method of claim 17, wherein said functional group that is attached to said first point of said polymer backbone and has an affinity for titanium dioxide is formed by the reaction of said polymer backbone with a compound selected from the group of a urea, an amide, an amino alcohol, an amino acid, a hydroxyl acid, and a polyol.

24. The method of claim 17, wherein said functional group that is attached to said first point of said polymer backbone and has an affinity for titanium dioxide is formed by the reaction of said polymer backbone with an amino alcohol.

25. The method of claim 17, wherein said functional group attached to said polymer backbone and having an affinity for latex is a super hydrophobic functional group.

26. The method of claim 17, wherein said hydrophobic functional group attached to said polymer backbone and having an affinity for latex is formed by the reaction of said polymer backbone with a compound including an aliphatic, aromatic or aliphatic-aromatic group.

27. The method of claim 17, wherein said hydrophobic functional group attached to said polymer backbone and having an affinity for latex is formed by the reaction of said polymer backbone with an alcohol.

28. The method of claim 17, wherein said hydrophobic functional group attached to said polymer backbone and having an affinity for latex is formed by the reaction of said polymer backbone with a compound selected from the group of an ester, a thiol, an acid, an anhydride and an acyl halide.

29. The method of claim 17, wherein said the water soluble polymer backbone is polyethylene glycol or polyethylene glycol-co-polypropylene glycol.

30. The method of claim 17, wherein said titanium dioxide particles are rutile titanium dioxide particles manufactured by the chloride process.

31. The method of claim 17, wherein said polymer is associated with said titanium dioxide particles by mixing said polymer with said titanium dioxide particles in an aqueous medium.

32. The method of claim 17, wherein said polymer is present in said titanium dioxide pigment composition in an amount in the range of from 0.01 to 1% by weight, based on the total weight of said titanium dioxide pigment composition.

* * * * *